June 23, 1931.  R. O. WOOD ET AL  1,810,935
APPARATUS FOR SCREENING LIQUID MATERIALS
Filed Aug. 26, 1929
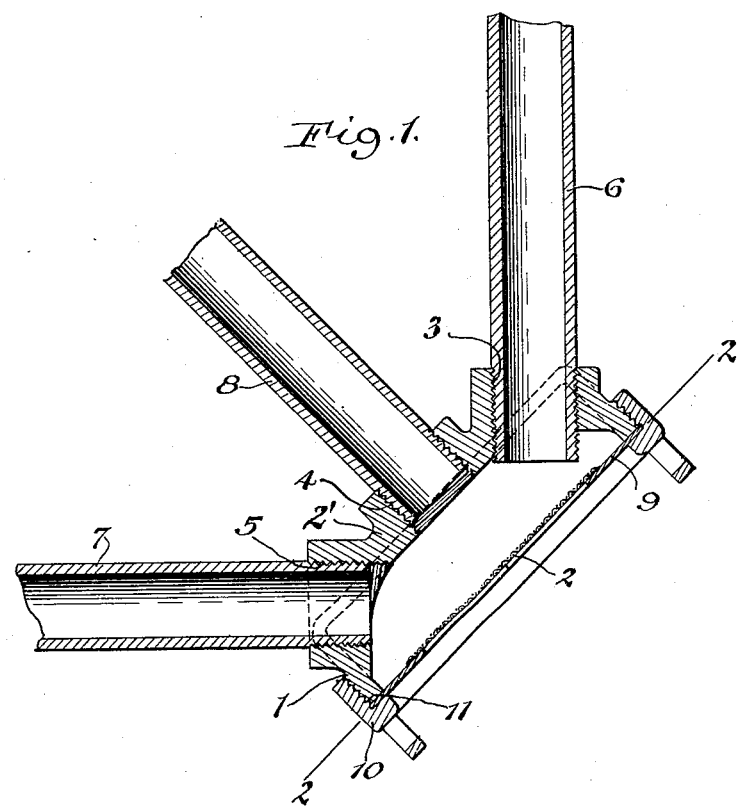
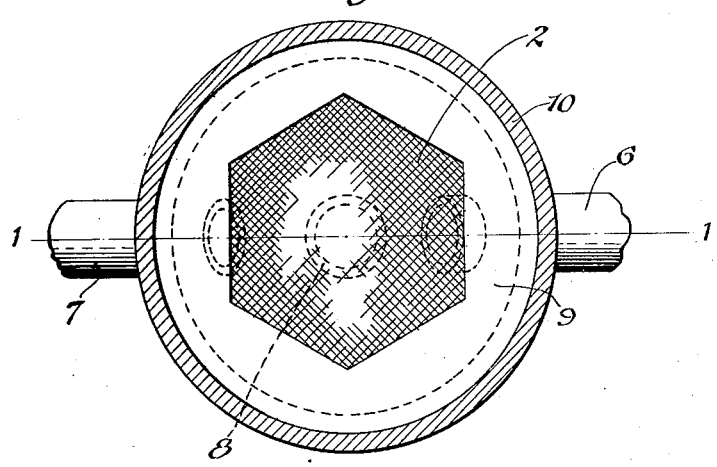
Inventors
ROBERT O. WOOD
BYRON L. WEST
by Forbes Silsby
Attorney Patented June 23, 1931

1,810,935

UNITED STATES PATENT OFFICE

ROBERT O. WOOD AND BYRON L. WEST, OF HAMBURG, NEW YORK, ASSIGNORS TO NATIONAL ANILINE & CHEMICAL COMPANY, INC., OF NEW YORK, N. Y., A CORPORATION OF NEW YORK

APPARATUS FOR SCREENING LIQUID MATERIALS

Application filed August 26, 1929. Serial No. 388,527.

The present invention relates to an apparatus for screening fluid materials, such as dye pastes, etc., to remove lumps, grit and foreign matter. It pertains to an apparatus adapted for use in a process for preparing dye pastes as described and claimed in the copending application of Robert O. Wood, Serial No. 388,526 filed of even date herewith. Such a process does not form a part of the invention as herein claimed.

Many finely divided materials are used in the fluid form and it has been difficult heretofore to remove inequalities in the consistency of such fluids. In particular, dye pastes intended for the printing of designs on fabrics, have caused trouble. These pastes are applied to the fabric by means of a copper roll, on the surface of which is engraved the design to be printed on the cloth. In operation, the surface of the roll is completely coated with dye paste which is then scraped off cleanly from the smooth portions with a device called a doctor, leaving the depressions in the roll filled with dye paste. It is necessary that these pastes be absolutely free from lumps and grit, since any grit present in the dye paste is liable to score the smooth portions of the roll when scraped off by the doctor. Any depression so formed will become filled with dye paste and will cause a blemish in the printed design. Also, any lumps in the paste will either be scraped out of the design by the doctor, leaving an uncovered space which will be imparted to the cloth as a blank or, if smaller, will not be removed by the doctor and will produce a heavier spot in the finished print.

Accordingly, one of the objects of the present invention is to provide an apparatus for screening dye pastes or materials of like consistency which will remove all lumps, grit and foreign matter.

Another object of the invention is to provide a screening apparatus which will be efficient in operation and inexpensive to manufacture.

A further object is to provide an apparatus which is simple in construction, practically automatic in operation, has a low maintenance cost, and which requires little or no attention during operation.

The invention accordingly comprises an apparatus embodying features of construction, combinations of elements and arrangement of parts which are adapted to accomplish such objects, all as exemplified in the following detailed disclosure and defined in the claims.

As an illustrative embodiment of an apparatus constructed in accordance with the invention, the following description is presented.

Figure 1 is a view in section along the line 1—1 of Fig. 2; and Figure 2 is a section along the line 2—2 of Fig. 1.

Referring to the drawings, the apparatus comprises a cylindrical or bell-shaped casing 1 having a screen 2 disposed across one end thereof, the other end or head 2' having the openings 3, 4 and 5 therein for a purpose which will be indicated hereinafter. An inlet pipe 6 enters the casing through the opening 3 and extends inward to a point close to the surface of the screen. An outlet pipe 7 passes through the opening 5 and provides a discharge for unscreened or run-off materials which accumulate in the casing. The inlet pipe 6 and the outlet pipe 7 are shown each disposed at an angle of about 45° to the face of the screen, thus forming between them about a 90° angle. However, it will be understood that this angular placement is not limited by the above description.

The foraminous member 2 which may be a cloth or a wire screen of fine mesh is soldered, welded or otherwise suitably secured to the annular disc 9, and covers the hexagonal opening therein. The disc 9 is clamped between the end of the casing 1 and the inwardly turned flange of cap 10 which is threaded onto the end of the casing. However, the disc may be held in place by other suitable means.

In operation, material to be screened enters inlet pipe 6 and, passing through the pipe, is discharged, at an angle, against the screen 2. The material sweeps across the screen and the finer portions, for the most part, pass through the screen and may be collected by suitable means, not shown. Coarse or run-off material which does not pass through the screen is discharged through the exit pipe 7 and may be recirculated into pipe 6 by suitable means, not shown. The vent 4 having the stand pipe 8 therein permits access of air to the interior of the screen chamber and serves to maintain the air pressure equal on both sides of the screen. By avoiding differences in air pressure on the two sides of the screen, the material on the screen is prevented from acting as a filter and eventually clogging the screen.

The apparatus may be disassembled for replacements, cleaning or repairs, etc., in a simple operation. The cap 10 may be screwed off, thus releasing the disc 9 which carries the screen, and the pipes 6, 7 and 8 which are threaded into the head may also be removed by a simple operation.

It will be readily apparent that the apparatus herein described exemplifies one means for accomplishing the objects set forth. Various changes may be made in the specific details of construction and design of the apparatus without departing from the scope of the invention as defined by the appended claims.

We claim:

1. An apparatus of the character described comprising a screening chamber having a foraminous member therein, means for projecting a stream of material to be screened directly against the foraminous member, means for conveying away run-off material which collects in the chamber and means for equalizing air pressures on the two sides of the foraminous member.

2. An apparatus of the character described comprising a screening chamber having a foraminous member therein, means for projecting a stream of material to be screened at an angle directly against the foraminous member, means for conveying away run-off material which collects in the chamber and means for equalizing air pressures on the two sides of the foraminous member.

3. An apparatus for screening material in paste form comprising a bell-shaped casing having inlet and outlet openings therein, a cap threaded onto the open end of the casing, an annular disc carrying a screen clamped across the open end of the casing, and means for projecting a stream of liquid directly against the screen.

4. An apparatus for screening materials in paste form comprising a bell-shaped casing, an inlet and an outlet and an air vent in said casing, an annular disc attached to the open end of said casing, and a screen carried by said disc.

5. An apparatus for screening material in paste form comprising a bell-shaped casing, a screen attached to said casing, an inlet and an outlet for said material in said casing angularly disposed with respect to said screen, and an air vent in said casing.

6. An apparatus for screening materials in paste form comprising a bell-shaped casing, a screen attached to said casing, an inlet for said materials in said casing disposed at an angle of about 45° to said screen, an outlet for said material disposed at an angle of about 90° to said inlet, and an air vent.

7. An apparatus for screening material in paste form comprising a chamber having a foraminous member therein, means for projecting a stream of material directly against said foraminous member and means for equalizing air pressures on the two sides of the foraminous member.

ROBERT O. WOOD.
BYRON L. WEST.